United States Patent [19]

Inoue et al.

[11] Patent Number: 5,223,236
[45] Date of Patent: Jun. 29, 1993

[54] METHOD FOR EXHAUST GAS CLEANING

[75] Inventors: Shunji Inoue; Senshi Kasahara; Akinori Eshita, all of Shinnanyo; Masao Nakano, Hikari, all of Japan

[73] Assignee: Tosoh Corporation, Shinnanyo, Japan

[21] Appl. No.: 789,636

[22] Filed: Nov. 12, 1991

Related U.S. Application Data

[63] Continuation-in-part of Ser. No. 451,871, Dec. 18, 1989, abandoned.

[30] Foreign Application Priority Data

Dec. 16, 1988 [JP] Japan .................. 63-316291
Dec. 13, 1989 [JP] Japan .................. 1-323330

[51] Int. Cl.$^5$ .................................. C01B 21/20
[52] U.S. Cl. ....................... 423/213.2; 423/213.5; 423/239; 502/64; 502/66; 502/71
[58] Field of Search ............ 423/213.2, 213.5, 239

[56] References Cited

U.S. PATENT DOCUMENTS

| | | |
|---|---|---|
| 3,276,993 | 10/1966 | Reid . |
| 3,926,782 | 12/1975 | Plank et al. .................. 208/135 |
| 4,297,328 | 10/1981 | Ritscher et al. ............... 423/213 |
| 4,714,601 | 12/1987 | Vaughan ........................ 502/77 |
| 4,980,052 | 12/1990 | Green et al. .................. 423/239 |
| 5,041,270 | 8/1991 | Fujitani et al. ............... 423/213.2 |

FOREIGN PATENT DOCUMENTS

| | | |
|---|---|---|
| 0087906 | 9/1983 | European Pat. Off. . |
| 0291704 | 4/1988 | European Pat. Off. . |
| 0272136 | 6/1988 | European Pat. Off. . |
| 0286967 | 10/1988 | European Pat. Off. ........... 423/239 |
| 3722081 | 1/1981 | Fed. Rep. of Germany . |

OTHER PUBLICATIONS

Determination of External Surface Area of ZSM-5 Type Zeolite, Journal of Catalysis 81,485-488 (1983).
Spectroscopy of prismatic and cube-shaped ZSM-5 crystals 184 ZEOLITS, 1991 vol. 11, Feb.
Transport and Reactivity of Hydrocarbon Molecules in a Shape-Selective Zeolite by Werner O. Haag, Rudolph M. Lago and Paul B. Weisz, Central Research Division Mobil Research and Development Corporation, P.O. Box 1025, Princeton, N.J. 08540, U.S.A. (Sep. 1981).
Benzene-Filled Pore Method: A Method of Measuring External Surface Areas Applicable to Zeolites with Low-to-High Si-to-Al Ratios, Journal of Catalysis 100, 264-269 (1986).

*Primary Examiner*—Wayne Langel
*Attorney, Agent, or Firm*—Oblon, Spivak, McClelland, Maier & Neustadt

[57] ABSTRACT

A method for cleaning an exhaust gas, entailing bringing the exhaust gas into contact with a crystalline aluminosilicate having a primary particle size of not less than 0.5 micron, containing one or more kinds of metal ions selected from the group of metals of Group Ib and Group VIII of the periodic table in an amount ranging from about 0.2 to 0.8 equivalent relative to one gram atom of aluminum, and having a mole ratio of $SiO_2/Al_2O_3$ of not less than about 20.

7 Claims, No Drawings

METHOD FOR EXHAUST GAS CLEANING

This application is a Continuation-In-Part of application Ser. No. 07/451,871, filed on Dec. 18, 1989, now abandoned.

BACKGROUND OF THE INVENTION

1. Field of the Invention

The present invention relates to a method for cleaning exhaust gas discharged from internal combustion engines of automobiles or factory boilers, for example, using a catalyst having improved heat resistance.

2. Description of the Background

Various methods have been investigated for eliminating noxious components from exhaust gases discharged from internal combustion engines of automobiles, for example. A conventional method for eliminating noxious components from the exhaust gases is to bring the gases into contact with a catalyst, for example, to effect catalytic reduction. This method requires a reducing agent such as ammonia, hydrogen or carbon monoxide, for example, and additionally requires the use of special equipment for recovering or decomposing the unreacted reducing agent. On the contrary, a catalytic decomposition method allows the elimination of noxious components, especially nitrogen oxides, from the exhaust gases without a special reducing agent and only by passing the exhaust gas through a catalyst layer. This method is most advantageous in view of the simplicity of the process. A catalyst used in this process is a crystalline aluminosilicate catalyst containing copper and having a $SiO_2/Al_2O_3$ mole ratio ranging from 20 to 100. See Japanese Laid-Open Patent Application No. Sho 60-125250.

However, the use of the aforementioned exhaust-gas-cleaning catalyst composed of a crystalline aluminosilicate containing copper ion involves the disadvantage of significant deterioration of the activity at a high operating temperature: namely, a remarkable decrease in catalyst activity, after contact with a high-temperature exhaust gas.

Also, there has been an increasing demand for the use of diluted gasolines for combustion in order to lower the fuel cost or reduce the exhausted carbon dioxide gas from internal combustion engines. In this case the exhausted gas contains excessive oxygen for which the above-mentioned conventional "three-way" catalysts cannot be used and, moreover, no practical method has been established for eliminating noxious components.

SUMMARY OF THE INVENTION

Accordingly, it is an object of the present invention to provide a method for preventing the deterioration of the exhaust-gas-cleaning activity of an exhaust-gas-cleaning catalyst caused by contact with a high-temperature gas.

It is also an object of the present invention to provide a catalyst which does not substantially lose its exhaust-gas-cleaning activity even when brought into contact with an exhaust gas at high temperature.

These objects and others which will become more apparent are provided by a method for cleaning an exhaust ga which entails contacting the exhaust gas with a crystalline aluminosilicate having a primary particle size of not less than 0.5 $\mu$, containing one or more kinds of metal ions selected from the group consisting of metals of Group Ib of the Periodic Table in an amount ranging from about 0.2 to 0.8 equivalent relative to one gram atom of aluminum, and having a mole ratio of $SiO_2/Al_2O_3$ of not less than about 20.

DETAILED DESCRIPTION OF THE PREFERRED EMBODIMENTS

The crystalline aluminosilicate for the base material of the present invention has essentially a mole ratio of $SiO_2/Al_2O_3$ of not less than about 20. With such a mole ratio of less than about 20, the deterioration of the catalytic exhaust-gas-cleaning activity cannot be prevented. The mole ratio is desired to be at least about 20 immediately after the crystalline aluminosilicate is synthesized. Any method of production may be used provided that the size of the primary particle produced is not less than 0.5 micron. For example, ZSM-5, mordenite, or the like which has a primary particle size of not less than 0.5 micron, may be used as the base material in the present invention. The crystalline aluminosilicate used as the base material of the present invention is almost inactive in cleaning exhaust gases without further modification.

The size of the primary particles of the crystalline aluminosilicate of the present invention should preferably be at least about 0.5 micron, and more preferably, in the range of from about 1 to 50 microns. The term "primary particle size" means here the crystal size, which is usually determined by scanning electron microscopy. The crystalline aluminosilicate having a particle size of less than 0.5 micron cannot exhibit high activity in cleaning exhaust gases after it is brought into contact with the same at an elevated temperature. This is because smaller particles have a structure which is liable to be destroyed when the atomic bonds are broken by thermal vibra ion of skeleton atoms and exchanged ions.

On the other hand, it is desired that the crystalline aluminosilicate have a particle size of not larger than 50 microns because a larger particle size provides less contact surface area of the catalyst to thereby lower the catalytic activity. Also, difficulties in ion-exchange operations are also caused.

The catalyst in the present invention preferably contains one or more kinds of metal ions selected from the group of metals of Group Ib and Group VIII of the periodic table in an amount ranging from about 0.2 to 0.8 equivalent relative to one gram atom of aluminum. Noxious components in exhaust gases cannot be satisfactorily eliminated if the amount of the metal ion is less than 0.2 equivalent relative to one gram atom of aluminum. On the other hand, if the amount exceeds 0.8 equivalent, the effect of the elimination is little for the content of the metal ion, and moreover, the heat resistance of the catalyst is adversely affected. This is because excessive metal ion exchange tends to form weak metal ion bonds and the bonds of the zeolite skeleton are liable to be broken by thermal vibration.

The aluminum in the crystalline aluminosilicate mentioned above means aluminum which is neutralized by bonding with a metal of Group Ib or Group VIII, and does not include an aluminum cations contained in materials such as alumina sol, alumina or silica-alumina, for example, added as a binder or a diluent in molding the catalyst or a carrier, nor aluminum cations introduced by the exchange of cation in the ion exchange.

In order to adjust the amount of the above-mentioned one or more kinds of metal ions of the present invention to be in the range of from about 0.2 to 0.8 equivalent relative to one gram atom of aluminum, the ion exchange may be conducted by bringing an crystalline aluminosilicate having a primary particle size of not less than 0.5 micron with an aqueous or nonaqueous solution (e.g., an organic solvent) containing one or more of the above-mentioned metal ions. In this ion exchange, water is the most preferable medium. An organic solvent may be used if it is capable of ionizing the above-mentioned metals. Suitable solvents include alcohols such as methanol, ethanol, and propanol; amides such as dimethylformamide, and diacetamide; ethers such as diethyl ether; and ketones such as dimethyl ketone and methyl ethyl ketone.

The metal ions which may be used include copper, silver, gold, nickel, palladium, platinum, cobalt, rhodium, iridium, iron, ruthenium and osmium. Particularly preferable metals are copper, cobalt and nickel, for example.

The sources of the above-mentioned metal ions include inorganic salts and the organic salts of the metals such as chlorides, bromides, carbonates, sulfates, nitrates, nitrites, sulfides, acetates, formates, benzoates, and tartrates, for example. Particularly preferable metal salts are nitrates, acetates, and chlorides.

The ion exchange may be conducted by immersing a crystalline aluminosilicate having a primary particle size of 0.5 micron or more as estimated by a scanning electron microscope in a solution containing one or more kinds of metal ions of Group Ib or Group VIII, or otherwise by allowing a solution containing one or more of the above-mentioned metal ions to flow down through a contact column packed with the crystalline aluminosilicate. An amine complex of the above-mentioned metals may be used in the ion exchange.

The concentration of the metal ion in the solution, the amount of the solution, and the contact time are suitably selected to satisfy the condition of incorporating into the crystalline aluminosilicate one or more of metal ions selected from the group of metals of Group Ib and Group VIII of the periodic table in a amount ranging from about 0.2 to 0.8 equivalent relative to one gram atom of aluminum.

The aluminosilicate having been subjected to the ion exchange is washed, and if necessary, calcined at a temperature of from about 300° to 700° C., preferably from about 350° to 600° C.

In the calcination, the aluminosilicate after ion exchange may be calcined as it is, or calcined after it is pelletized with a natural clay such as kaolin, halloysite, montmorillonite, etc. and/or inorganic compounds such as alumina, silica, magnesia, titania, zirconia, hafnia, aluminum phosphate, a binary gel e.g. silica-alumina, silica-zirconia, and silica-magnesia, and a ternary gel of e.g. silica-magnesia-alumina, etc.

For the use of the catalyst of the present invention for eliminating noxious components from an exhaust gas, the catalyst is preferably molded into a form having a sufficient area to contact with the exhaust gas and allowing easy flow of the gas, such as in a form of a cylinder, a sphere, a Raschig ring, or a honeycomb, or a monolithic catalyst of coated ceramic honeycomb structure.

The ion exchange may also be conducted after the molding.

An exhaust gas is cleaned by employing the above-described crystalline aluminosilicate. The exhaust gas has only to be brought into contact with the catalyst irrespective of the origin of the gas. The contact temperature is from about 200° to 1000° C., and the contact time is not specifically limited.

The catalyst employed in the present invention exhibits high activity in cleaning gases exhausted from internal combustion engines of automobiles, and factory boilers even after treated at an elevated temperature.

The present invention provides a catalyst having a high catalytic activity for cleaning exhaust gases, even after contact with a high-temperature exhaust gas by using a crystalline aluminosilicate having a primary particle size of not less than 0.5 micron, containing one or more kinds of metal ions selected from the group of metals of Group Ib and Group VIII of the periodic table in an amount ranging from about 0.2 to 0.8 equivalent relative to one gram atom of aluminum, and having a mole ratio of $SiO_2/Al_2O_3$ of not less than about 20.

The present invention will now be further illustrated by reference to certain examples, which are provided solely for illustration and are not intended to be limitative.

EXAMPLE 1

Zeolite Synthesis

An aqueous sodium silicate solution (containing 150.9 g/l of $SiO_2$, 47.8 g/l of $Na_2O$, and 0.1 g/l of $Al_2O_3$) and an aqueous aluminum sulfate solution containing sulfuric acid (containing 22.3 g/l of $Al_2O_3$, 216.7 g/l of $H_2SO_4$) were fed continuously at a rate of 3.2 l/hr, and 0.8 l/hr, respectively into an overflow type reaction vessel having a net volume of 2 liters under agitation. The reaction temperature was 60° C., and the pH of the slurry was 7.0. The discharged slurry was separated into solid and liquid by centrifugation, and was washed sufficiently to give a fine particulate homogeneous amorphous compound of aluminosilicate having a composition of 1.73% by weight of $Na_2O$, 2.31% by weight of $Al_2O_3$, 62.8% by weight of $SiO_2$, and 33.2% by weight of $H_2O$. 1720 g of the homogeneous compound and 5281 g of 1.27% (by weight) aqueous NaOH solution were charged into a 10-liter autoclave, and treated for crystallization by agitating at 180° C. for 23 hours. The resulting mixture were subjected to solid-liquid separation, water-washing, and drying, to give a zeolite TG45 for a base material of an exhaust gas cleaning catalyst. Chemical analysis thereof gave the composition represented by mole ratio of oxides on an anhydrous base as below:

$$0.99Na_2O.Al_2O_3.39.8SiO_2$$

The interplanar spacings (d-values) derived from the powder X-ray diffracton pattern are shown in Table 1.

The size of the primary particles of the TG45 was approximately 3 microns according to scanning electron microscopy.

TABLE 1

| Interplanar Spacing (d-value) | Relative Strength |
|---|---|
| 11.1 ± 0.3 | high |
| 10.0 ± 0.3 | high |
| 7.4 ± 0.2 | low |
| 7.1 ± 0.2 | low |
| 6.3 ± 0.2 | low |
| 6.04 ± 0.2 | low |
| 5.56 ± 0.1 | low |
| 5.01 ± 0.1 | low |
| 4.60 ± 0.08 | low |
| 4.25 ± 0.08 | low |
| 3.85 ± 0.07 | very high |

TABLE 1-continued

| Interplanar Spacing (d-value) | Relative Strength |
| --- | --- |
| 3.71 ± 0.05 | high |
| 3.04 ± 0.03 | low |
| 2.99 ± 0.02 | low |
| 2.94 ± 0.02 | low |

EXAMPLE 2

Zeolite Synthesis

An aqueous sodium silicate solution (containing 150.0 g/l of $SiO_2$, 47.8 g/l of $Na_2O$, and 0.1 g/l $Al_2O_3$) and an aqueous aluminum sulfate solution containing sulfuric acid (containing 13.2 g/l of $Al_2O_3$, 251.4 g/l of $H_2SO_4$) were fed continuously at a rate of 3.2 l/hr, and 0.8 l/hr, respectively into an overflow type reaction vessel having a net volume of 2 liters under agitation. The reaction temperature was 60° C., and the pH of the slurry was 7.0. The discharged slurry was separated into solid and liquid by centrifugation, and was washed sufficiently to give a fine particulate homogeneous amorphous compound of aluminosilicate having a composition of 0.794% by weight of $Na_2O$, 1.03% by weight of $Al_2O_3$, 45.1% by weight of $SiO_2$, and 53.1% by weight of $H_2O$. 4570 g of the homogeneous compound, 2445 g of 6.93% (by weight) aqueous NaOH solution, 1185 g of tetrapropylammonium bromide, and 200 g of sodium fluoride were charged into a 10-liter autoclave, and treated for crystallization by agitating at 160° C. for 72 hours. The resulting mixture were subjected to solid-liquid separation, water-washing, aqueous-ammonium-nitrate-washing, and drying to give a zeolite TG70 for a base material of an exhaust gas cleaning catalyst. Chemical analysis thereof gave the composition represented by mole ratio of oxides on an anhydrous base as below:

$Al_2O_3 \cdot 44.2SiO_2$

The d-values derived from the powder X-ray diffraction pattern were fundamentally the same as those shown in Table 1.

The size of the primary particles of the TG70 was approximately 20 microns according to scanning electron microscopy.

EXAMPLE 3

Preparation of Exhaust-Gas-Cleaning Catalyst 10 g of TG45 prepared in Example 1 was put into an aqueous 2 mol/l ammonium chloride solution weighed out in an amount corresponding to ammonium molecules of 10 times in number of the aluminum atoms in the zeolite, and was stirred at the liquid temperature of 60° C. for 2 hours. After solid-liquid separation, the solid matter was washed with water sufficiently, and was dried at 100° C. for 10 hours.

The resulting zeolite, and 10 g of the TG70 obtained in Example 2 were respectively treated as below. The zeolite was put into an aqueous 0.1 mol/l copper (II) acetate solution weighed out in an amount corresponding to copper atoms equivalent in number to the aluminum atoms in the zeolite, and was stirred at a room temperature. Immediately, 2.5% ammonia solution was added thereto to adjust the pH of the slurry to 10.5, and the slurry was stirred at a room temperature for 12 hours. After solid-liquid separation, the solid matter was washed with water sufficiently, and was dried at 100° C. for 10 hours.

The resulting catalysts were employed respectively as Cu-TG45, and Cu-TG70.

Table 2 shows the copper ion exchange rates, the copper contents, and the sodium contents of the exhaust-gas-cleaning catalysts as determined by chemical analysis. The copper ion exchange rate was based on the assumption that the copper is exchanged as bivalent copper.

EXAMPLE 4

Preparation of Exhaust-Gas-Cleaning Catalyst 10 g of TG45 prepared in Example 1 was put into an aqueous 2 mol/l ammonium chloride solution was weighed out in an amount corresponding to ammonium molecules of 10 times in number of the aluminum atoms in the zeolite, and was stirred at the liquid temperature of 60° C. for 2 hours. After solid-liquid separation, the solid matter was washed with water sufficiently, and was dried at 100° C. for 10 hours.

The resulting zeolite, and 10 g of the TG70 obtained in Example 2 wer respectively treated as below. The zeolite was put into an aqueous 0.1 mol/l cobalt nitrate solution weighed out in an amount corresponding to cobalt atoms equivalent in number to the aluminum atoms in the zeolite, and was stirred at a room temperature. Immediately, 2.5% ammonia solution was added thereto to adjust the pH of the slurry to 10.5, and the slurry was stirred at a room temperature for 12 hours. After solid-liquid separation, the solid matter was washed with water sufficiently, and was dried at 100° C. for 10 hours.

The resulting catalysts were employed respectively as Co-TG45, and Co-TG70.

Table 3 shows the cobalt ion exchange rates, the cobalt contents, and the sodium contents of the exhaust-gas-cleaning catalysts as determined by chemical analysis. The cobalt ion exchange rate was based on the assumption that the cobalt is exchanged as bivalent cobalt.

COMPARATIVE EXAMPLE 1

Preparation of Comparative Catalyst 1

ZSM-5 was synthesized as a comparative catalyst base material MG-1 according to Comparative Example 1 of Japanese Laid-Open Patent Application No. Sho 53-149699 (corresponding to U.S. Pat. No. 4,100,090). The chemical analysis thereof gave the composition represented by a mole ratio of oxides on an anhydrous base as below:

$0.65Na_2O \cdot Al_2O_3 \cdot 68.8SiO_2$

The d-value derived from powder X-ray diffraction pattern was fundamentally the same as those shown in Table 1.

The size of the primary particles of the MG-1 was approximately 0.1 micron according to scanning electron microscopy.

10 g of MG-1 thus prepared was put into 2 mol/l ammonium chloride solution weighed out in an amount corresponding to ammonium molecules of 10 times in number of the aluminum atoms in the zeolite, and was stirred at the liquid temperature of 60° C. for 2 hours. After solid-liquid separation, the solid matter was washed with water sufficiently, and was dried at 100° C. for 10 hours.

The resulting zeolite was put into 0.1 mol/l copper (II) acetate solution weighed out in an amount corresponding to copper atoms equivalent in number to the aluminum atoms in the zeolite, and was stirred at a room temperature. Immediately, 2.5% ammonia solution was added thereto to adjust the pH of the slurry to 10.5, and the slurry was stirred at a room temperature for 12 hours. After solid-liquid separation, the solid matter was washed with water sufficiently, and was dried at 100° C. for 10 hours to give Comparative catalyst 1.

Table 4 shows the copper ion exchange rates, the copper contents, and the sodium contents of the Comparative catalyst 1 as determined by chemical analysis. The copper ion exchange rate was based on the assumption that the copper is exchanged as bivalent copper.

COMPARATIVE EXAMPLE 2

Preparation of Comparative Catalysts 2 and 3

10 g of TG45 prepared in Example 1 was put into 2 mol/l ammonium chloride solution weighed out in an amount corresponding to ammonium molecules of 10 times in number of the aluminum atoms in the zeolite, and was stirred at the liquid temperature of 60° C. for 2 hours. After solid-liquid separation, the solid matter was washed with water sufficiently, and was dried at 100° C. for 10 hours. The resulting product, and TG70 prepared in Example 2 were employed respectively as Comparative catalysts 2 and 3.

COMPARATIVE EXAMPLE 3

Preparation of Comparative Catalysts 4 and 5

10 g of TG45 prepared in Example 1 was put into 2 mol/l ammonium chloride solution weighed out in an amount corresponding to ammonium molecules of 10 times in number of the aluminum atoms in the zeolite, and was stirred at the liquid temperature of 60° C. for 2 hours. After solid-liquid separation, the solid matter was washed with water sufficiently, and was dried at 100° C. for 10 hours.

The resulting zeolite, and 10 g of the TG70 obtained in Example 2 were respectively treated as below. The zeolite was put into an aqueous 0.1 mol/l copper (II) acetate solution weighed out in an amount corresponding to copper atoms equivalent in number to the aluminum atoms in the zeolite, and was stirred at a room temperature. Immediately, 2.5% ammonium solution was added thereto to adjust the pH of the slurry to 10.5, and the slurry was stirred at room temperature for 12 hours. After solid-liquid separation, the solid matter was washed with water sufficiently, and was dried at 100° C. for 10 hours. The copper ion exchange operation described above was conducted three times.

The resulting catalysts were employed respectively as Reference catalysts 4 and 5.

Table 4 shows the copper ion exchange rates, the copper contents, and the sodium contents of the exhaust-gas-cleaning catalysts as determined by chemical analysis. The copper ion exchange rate was based on the assumption that the copper is exchanged as bivalent copper.

TABLE 2

|  | Cu-TG45 | Cu-TG70 |
|---|---|---|
| Copper Ion Exchange Rate (%) | 101 | 99 |
| Copper Content: CuO/Al$_2$O$_3$ | 1.01 | 0.99 |
| Na$_2$O Content (% by weight) | 0.015 | 0.009 |

$$\text{Equivalent relative to gram atom of Al} = \frac{\text{metal content}}{2}$$

TABLE 3

|  | Co-TG45 | Co-TG70 |
|---|---|---|
| Cobalt Ion Exchange Rate (%) | 99 | 98 |
| Cobalt Content: CoO/Al$_2$O$_3$ | 0.99 | 0.99 |
| Na$_2$O Content (% by weight) | 0.015 | 0.009 |

TABLE 4

|  | Comparative Catalyst | | |
|---|---|---|---|
|  | 1 | 4 | 5 |
| Copper Ion Exchange Rate (%) | 105 | 180 | 175 |
| Copper Content: CuO/Al$_2$O$_3$ | 1.05 | 1.80 | 1.75 |
| Na$_2$O Content (% by weight) | 0.010 | 0.009 | 0.009 |

EXAMPLE 5

Evaluation of heat resistance of the Exhaust-Gas-Cleaning Catalysts

The exhaust-gas-cleaning catalysts prepared in Example 3 and Example 4 were placed in an electric oven. The temperature of the oven was elevated at a rate of 5° C./min up to 900° C., which temperature was maintained for 6 hours. The power source was then turned off and the oven was left to cool spontaneously to room temperature. The operation was conducted in a dry air environment. The heat resistance was evaluated on the basis of crystallinity which is represented by the ratio of the peak intensities of the d-value, before and after the heat treatment, of the X-ray diffraction pattern derived from powder X-ray diffraction. The results of the evaluation are shown in Table 5.

COMPARATIVE EXAMPLE 4

Evaluation of Heat Resistance of the Comparative Catalysts

The comparative catalysts prepared in Comparative Examples 1, 2 and 3 were treated in the same manner as in Example 5, and were evaluated for heat resistance similarly. The results are shown in Table 5.

TABLE 5

| Catalyst | Heat Resistance (crystallinity: %) |
|---|---|
| Cu-TG45 | 91 |
| Cu-TG70 | 88 |
| Co-TG45 | 89 |
| Co-TG70 | 87 |
| Comparative Catalyst 1 | 54 |
| Comparative Catalyst 2 | 93 |
| Comparative Catalyst 3 | 90 |
| Comparative Catalyst 4 | 19 |
| Comparative Catalyst 5 | 20 |

EXAMPLE 6

Heat Resistance Evaluation 1 According to Exhaust-Gas-Cleaning Activity 0.65 g of the exhaust-gas-cleaning catalysts prepared in Example 3 and Example 4 were respectively packed in an atmospheric pressure fixed-bed reaction tube. The catalyst is pretreated under the flow of the reaction gas having the composition below at a gas flow rate of 600 ml/min at 500° C. for 0.5 hour. Then the temperature was elevated at a constant rate to 800° C. The NO-cleaning rate was measured at each temperature (Reaction 1).

| Reaction gas composition: | |
|---|---|
| NO | 1000 ppm |
| $O_2$ | 4% |
| CO | 1000 ppm |
| $C_3H_6$ | 500 ppm |
| $H_2O$ | 4% |
| $N_2$ | balance |

The heat treatment was conducted at 800° C. for 5 hours. Subsequently the temperature was lowered to 200° C., which temperature was kept for 0.5 hour as pretreatment. Then the temperature was again elevated at a constant rate up to 800° C. The NO-cleaning rate was measured at each temperature (Reaction 2). The heat-resistance was evaluated by the change of the rate of cleaning the NO, which was considered to be a noxious component, in Reaction 1 and Reaction 2. The evaluation results are shown in Table 6 and 7.

The NO cleaning rate is represented by the following formula:

$$NO\ cleaning\ rate\ (\%) = (NO_{in} - NO_{out})/NO_{in} \times 100$$

where "$NO_{in}$" is a concentration of NO at the inlet of the fixed bed reaction tube, and "$NO_{out}$" is a concentration of NO at the outlet of the fixed bed reaction tube.

COMPARATIVE EXAMPLE 5

Heat-Resistance Evaluation 1 According to Exhaust-Gas-Cleaning Activity of Comparative Catalysts The comparative catalysts prepared in Comparative Examples 1, 2 and 3 were examined for heat-resistance in the same manner as in Example 6. The results are shown in Table 8 and Table 9.

TABLE 6

| Temperature (°C.) | NO Cleaning Rate (%) | | | |
|---|---|---|---|---|
| | Cu-TG45 Reaction | | Cu-TG70 Reaction | |
| | 1 | 2 | 1 | 2 |
| 300 | 31 | 20 | 30 | 20 |
| 350 | 48 | 35 | 49 | 36 |
| 400 | 57 | 48 | 56 | 49 |
| 450 | 56 | 50 | 54 | 52 |
| 500 | 46 | 36 | 46 | 38 |

TABLE 7

| Temperature (°C.) | NO Cleaning Rate (%) | | | |
|---|---|---|---|---|
| | Co-TG45 Reaction | | Co-TG70 Reaction | |
| | 1 | 2 | 1 | 2 |
| 300 | 27 | 15 | 28 | 15 |
| 350 | 46 | 29 | 45 | 27 |
| 400 | 53 | 42 | 52 | 40 |
| 450 | 51 | 44 | 51 | 42 |
| 500 | 40 | 32 | 42 | 33 |

TABLE 8

| Temperature (°C.) | NO Cleaning Rate (%) of Comparative Catalyst | | | | | |
|---|---|---|---|---|---|---|
| | 1 Reaction | | 2 Reaction | | 3 Reaction | |
| | 1 | 2 | 1 | 2 | 1 | 2 |
| 300 | 30 | 9 | 5 | 5 | 5 | 5 |
| 350 | 48 | 20 | 5 | 5 | 5 | 5 |
| 400 | 56 | 25 | 5 | 5 | 5 | 5 |
| 450 | 53 | 23 | 6 | 6 | 7 | 7 |
| 500 | 45 | 20 | 7 | 6 | 7 | 7 |

TABLE 9

| Temperature (°C.) | NO Cleaning Rate (%) of Comparative Catalyst | | | |
|---|---|---|---|---|
| | 4 Reaction | | 5 Reaction | |
| | 1 | 2 | 1 | 2 |
| 300 | 56 | 10 | 54 | 12 |
| 350 | 50 | 10 | 49 | 13 |
| 400 | 45 | 9 | 45 | 12 |
| 450 | 35 | 9 | 36 | 11 |
| 500 | 30 | 9 | 31 | 10 |

From Tables 6, 7, 8 and 9, it is understood that the exhaust-gas-cleaning method of the present invention employing the crystalline aluminosilicate for exhaust-gas-cleaning catalyst gives higher exhaust-gas-cleaning activity and improved heat-resistance in comparison with comparative catalysts 1, 2, 3, 4, and 5 even after the exhaust-gas-cleaning catalyst is retained in a reaction gas at 800° C. for 5 hours.

EXAMPLE 7

Heat Resistance Evaluation 2 According to Exhaust-Gas-Cleaning Activity 0.65 g of the exhaust-gas-cleaning catalysts prepared in Example 3 were respectively packed in a normal-pressure fixed-bed reaction tube. The catalyst is pretreated under the flow of the reaction gas having the composition below at a gas flow rate of 600 ml/min at 500° C. for 0.5 hour. Then the temperature was elevated at a constant rate to 800° C. The NO-cleaning rate was measured at each temperature (Reaction 3).

| Reaction gas composition: | |
|---|---|
| NO | 1000 ppm |
| $O_2$ | 6% |
| CO | 1000 ppm |
| $C_3H_6$ | 500 ppm |
| $H_2O$ | 4% |

The heat treatment was conducted at 800° C. for 5 hours. Subsequently the temperature was lowered to 200° C., which temperature was kept for 0.5 hour as pretreatment. Then the temperature was again elevated at a constant rate up to 800° C. The NO cleaning rate was measured at each temperature (Reaction 4). The heat-resistance was elevated by the change of the rate of cleaning the NO, which was considered to be a noxious component, in Reaction 3 and Reaction 4. The evaluation results are shown in Table 10.

From the above results it is understood that the cleaning ability is high even under the presence of excessive $O_2$.

TABLE 10

| Temperature (°C.) | NO Cleaning Rate (%) | | | |
|---|---|---|---|---|
| | Cu-TG45 Reaction | | Cu-TG70 Reaction | |
| | 3 | 4 | 3 | 4 |
| 300 | 31 | 16 | 30 | 17 |
| 350 | 50 | 29 | 51 | 29 |
| 400 | 56 | 43 | 55 | 44 |
| 450 | 53 | 39 | 52 | 40 |
| 500 | 45 | 28 | 44 | 29 |

EXAMPLE 8

Preparation of Exhaust-Gas-Cleaning Catalyst 10 g of TG45 prepared in Example 1 was put into 2 mol/l ammonium chloride solution weighed out in an amount corresponding to ammonium molecules of 10 times in number of the aluminum atoms in the zeolite, and was stirred at the liquid temperature of 60° C. for 2 hours. After solid-liquid separation, the solid matter was washed with water sufficiently, and was dried at 100° C. for 10 hours.

The resulting zeolite was put into a mixed solution of 0.1 mol/l copper (II) acetate solution weighed out in an amount corresponding to copper atoms equivalent in number to ½ of the aluminum atoms in the zeolite and an aqueous 0.1 mol/l nickel acetate solution weighed out in an amount corresponding to nickel atoms equivalent in number to ½ of the aluminum atoms in the zeolite, and was stirred at a room temperature. Immediately, 2.5% ammonia solution was added thereto to adjust the pH of the slurry to 10.5, and the slurry was stirred at a room temperature for 12 hours. After solid-liquid separation, the solid matter was washed with water sufficiently, and was dried at 100° C. for 10 hours.

The resulting catalyst was employed as CuNi-TG45.

Table 11 shows the copper ion exchange rate, the nickel ion exchange rate, and the sodium contents of the exhaust-gas-cleaning catalysts as determined by chemical analysis. The copper and nickel ion exchange rates were based on the assumption that the copper and nickel are exchanged respectively as bivalent copper and bivalent nickel.

EXAMPLE 9

Heat Resistance Evaluation 3 According to Exhaust-Gas-Cleaning Activity 0.65 g of the exhaust-gas-cleaning catalysts prepared in Example 8 was respectively packed in a normal-pressure fixed-bed reaction tube. The catalyst is pretreated under the flow of the reaction gas having the composition below at a gas flow rate of 600 ml/min at 500° C. for 0.5 hour. Then the temperature was elevated at a constant rate up to 800° C. The NO-cleaning rate was measured at each temperature (Reaction 5).

| Reaction gas composition: | |
|---|---|
| NO | 1000 ppm |
| $O_2$ | 4% |
| CO | 1000 ppm |
| $C_3H_6$ | 500 ppm |
| $H_2O$ | 4% |

The heat treatment was conducted at 800° C. for 5 hours. Subsequently the temperature was lowered to 200° C., which temperature was kept for 0.5 hour as pretreatment. Then the temperature was again elevated at a constant rate up to 800° C. The NO-cleaning rate was measured at each temperature (Reaction 6). The heat-resistance was evaluated by the change of the rate of cleaning the NO, which was considered to be a noxious component, in Reaction 5 and Reaction 6. The evaluation results are shown in Table 12.

TABLE 11

| | Cu—Ni-TG45 |
|---|---|
| Copper Ion Exchange Rate (%) | 95 |
| Nickel Ion Exchange Rate (%) | 40 |
| $Na_2O$ Content (% by weight) | 0.009 |

Ion exchange rate = metal content 100

TABLE 12

| Temperature (°C.) | Reaction | |
|---|---|---|
| | 5 | 6 |
| 300 | 28 | 20 |
| 350 | 45 | 33 |
| 400 | 56 | 48 |
| 450 | 56 | 49 |
| 500 | 48 | 40 |

Having now described the present invention, it will be apparent to one of ordinary skill in the art that many modifications and changes can be made to the above embodiments while remaining within the spirit and scope of the present invention.

We claim:

1. A method for cleaning an exhaust gas containing $NO_x$, comprising bringing said exhaust gas into contact with ZSM-5 having a primary particle size of from 0.5 micron to 50 microns as estimated by a scanning electron microscope, containing one or more metal ions selected from the group of metals of group Ib of the periodic table in an amount ranging from about 0.2 to 0.8 equivalent relative to one gram atom of aluminum, and having a mole ratio of $SiO_2/Al_2O_3$ of not less than 20 to less than 100.

2. The method according to claim 1, wherein said ZSM-5 further contains one or more metal ions selected from the group of metals of Group VIII of the periodic table, with a total amount of the metal ions being from about 0.2 to 0.8 equivalent to one gram atom of aluminum.

3. The method according to claim 1, wherein said metal ion is copper.

4. A method for cleaning an exhaust gas containing $NO_x$, comprising bringing said exhaust gas into contact with ZSM-5 having a primary particle size of from 0.5 micron to 50 microns as estimated by a scanning electron microscope, containing one or metal ions selected from the group of metals of Group VIII of the periodic table in an amount ranging from about 0.2 to 0.8 equivalent relative to one gram atom of aluminum, and having a mole ration of $SiO_2/Al_2O_3$ of not less than 20 to less than 100.

5. The method according to claim 4, wherein the metal ion is nickel or cobalt.

6. The method according to claim 1 or claim 4, wherein the ZSM-5 has a primary particle size in the range of from about 1 to 50 microns.

7. A method for cleaning an exhaust gas containing $NO_x$, comprising bringing said exhaust gas into contact with ZSM-5 having a primary particle size of from 0.5 micron to 50 microns as estimated by a scanning electron microscope, containing one or more metal ions selected from the group of metals of Group Ib of the periodic table and one or more metal ions selected from the group of metals of Group VIII of the periodic table, each in an amount ranging from about 0.2 to 0.8 equivalent relative to one gram atom of aluminum, and having a mole ratio of not less than 20 to less than 100.

* * * * *